Patented Mar. 26, 1935

1,996,005

UNITED STATES PATENT OFFICE 1,996,005

NITRITE COMPOUND OF 2-CHLORO-6-NITROBENZALDIMERCURIOXIDE

Emeric Havas, South Milwaukee, Wis., assignor to E. I. du Pont de Nemours & Company, Wilmington, Del., a corporation of Delaware No Drawing. Application July 27, 1933, Serial No. 682,427

4 Claims. (Cl. 260—13)

This invention relates to the preparation of the nitrite of 2-chloro-6-nitrobenzaldimercurioxide, which is a new compound useful in the preparation of 2-chloro-6-nitrobenzaldoxime.

In my copending application Serial No. 682,426 filed of even date herewith, there is described the preparation of a new mercury compound of 2-chloro-6-nitrotoluene which I have designated 2-chloro-6-nitrobenzaldimercurioxide, and which has the following probable formula:

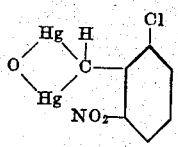

I have found that this new mercury substitution product of 2-chloro-6-nitrotoluene can be treated with nitrous acid to form a compound which on further treatment with acid will give 2-chloro-6-nitrobenzaldoxime of good quality and in high yields.

Reissert, in Berichte Volume 40, pages 4209–4226 has described the preparation of a similar compound from unsubstituted o-nitrotoluene. However in view of Reissert's work in which he found that even isomeric nitrotoluenes and 2-4 dinitrotoluene did not give products which would react the same as o-nitrotoluene itself, it was not to be expected that the reaction product of 2-chloro-6-nitro-toluene and mercuric oxide would react with nitrous acid to give a product that could be converted to 2-chloro-6-nitrobenzaldoxime in good yields and with practically no contaminating side products.

I have found that 2-chloro-6-nitrobenzaldimercurioxide will react with nitrous acid at temperatures between 15° and 32° C. to give a product which on treatment with a mineral acid will give 2-chloro-p-nitrobenzaldoxime in good yields. At temperatures below 15° C. the process is slow and the product is not in the best form for subsequent conversion to the aldoxime. Temperatures as high as 32° C. have been found to give good results.

The following example in which the parts given are by weight will serve to illustrate the preparation of this new product.

Example 586.5 parts of 2-chloro-6-nitrobenzaldimercurioxide are stirred at 22°–25° C. with about 4000 parts of water, 142 parts of technical sodium nitrite are added and 1000 parts of 10% sulfuric acid are dropped into the mixture until there is a slight acid reaction to Congo paper. The mass is then filtered, washed with water and dried at a low temperature. The product is a light yellow crystalline powder which starts to decompose at 50°–60° C. and has, very probably, the following formula:

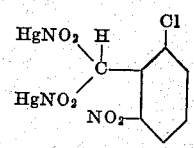

The amount of water used may vary within wide limits. While 10% sulfuric acid is specified in the example, any concentration from 5 to 75 or even stronger may be used, the concentration of the acid to be used depending in part upon the amount of water already present.

While I have given a probable formula for my new compound, it is not to be regarded as a limitation on my invention for while the product by analysis appears to be substantially a dinitrite of 2-chloro-6-nitro-benzaldimercurioxide, the absolute structure of the compound has not been proved.

What I claim is:

1. The nitrite of 2-chloro-6-nitrobenzaldimercurioxide, obtainable by reacting upon 2-chloro-6-nitrobenzaldimercurioxide with nitrous acid.

2. The dinitrite of 2-chloro-6-nitrobenzaldimercurioxide.

3. The process which comprises reacting 2-chloro-6-nitrobenzaldimercurioxide with nitrous acid at a temperature of 15° to 32° C. in aqueous suspension.

4. The process which comprises reacting 2-chloro-6-nitrobenzaldimercurioxide with nitrous acid.

EMERIC HAVAS.